US009189719B2

(12) United States Patent
Bremer

(10) Patent No.: US 9,189,719 B2
(45) Date of Patent: Nov. 17, 2015

(54) ENCODED INFORMATION READING TERMINAL INCLUDING MULTIPLE ENCODED INFORMATION READING DEVICES

(75) Inventor: Edward C. Bremer, Victor, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 13/593,174

(22) Filed: Aug. 23, 2012

(65) Prior Publication Data

US 2014/0054380 A1 Feb. 27, 2014

(51) Int. Cl.
*G06K 17/00* (2006.01)

(52) U.S. Cl.
CPC .................................. *G06K 17/0022* (2013.01)

(58) Field of Classification Search
CPC .................................................. G06K 17/0022
USPC .................... 235/444, 383; 380/243; 705/15; 340/10.3
See application file for complete search history.

(56) References Cited

U.S. PATENT DOCUMENTS 5,837,983 A 11/1998 Actis et al.
6,299,063 B1 10/2001 Freeman
6,357,662 B1 3/2002 Helton et al.
7,321,305 B2 1/2008 Gollu
7,504,949 B1 3/2009 Rouaix et al.
7,679,517 B2 3/2010 Finlayson
2003/0121981 A1* 7/2003 Slutsky et al. .......... 235/462.45
2006/0145875 A1 7/2006 Finlayson
2007/0018811 A1 1/2007 Gollu
2007/0075832 A1 4/2007 Morse et al.
2007/0115124 A1 5/2007 Brignone et al.
2007/0284441 A1* 12/2007 Walczyk et al. ............. 235/383
2008/0182541 A1 7/2008 Huang
2009/0002163 A1 1/2009 Farrington et al.
2009/0213811 A1* 8/2009 Wang et al. .................. 370/331
2010/0007496 A1 1/2010 Orlassino
2010/0249994 A1 9/2010 Sinclair
2010/0289623 A1 11/2010 Roesner
2011/0073654 A1* 3/2011 Wang et al. ............. 235/462.25
2012/0076297 A1* 3/2012 Koziol et al. ................ 380/243
2012/0127976 A1 5/2012 Lin et al.
2012/0139709 A1 6/2012 Campero et al.
2012/0161930 A1 6/2012 Subramanian et al.
2013/0054390 A1* 2/2013 Kerchner et al. ............... 705/17
2013/0091344 A1* 4/2013 Doren et al. ...................... 713/2
2013/0113608 A1* 5/2013 Subramanian et al. ...... 340/10.1

FOREIGN PATENT DOCUMENTS

EP 2 434 455 A2 3/2012

OTHER PUBLICATIONS

Sep. 17, 2014 Search Report issued in European Patent Application No. 13180310.8.

* cited by examiner

*Primary Examiner* — Thien M Le
*Assistant Examiner* — Asifa Habib
(74) *Attorney, Agent, or Firm* — Oliff PLC; R. Brian Drozd

(57) ABSTRACT

An encoded information reading (EIR) terminal can comprise a microprocessor, a memory, a communication interface, and a plurality of EIR devices. Each EIR device can be configured to output a decoded message responsive to reading decodable indicia. The EIR terminal can be configured to transmit via the communication interface to an external computer at least one decoded message corresponding to the decodable indicia read by an EIR device. The EIR terminal can be further configured to supplement the decoded message by a source identifier string identifying the EIR device.

17 Claims, 4 Drawing Sheets

ENCODED INFORMATION READING TERMINAL INCLUDING MULTIPLE ENCODED INFORMATION READING DEVICES

FIELD OF THE INVENTION

This invention relates generally to encoded information reading (EIR) terminals and, more specifically, to EIR terminals comprising two or more EIR devices.

BACKGROUND OF THE INVENTION

Various types of encoded information reading (EIR) terminals, such as hand-held bar code scanners, hands-free scanners, bi-optic in-counter scanners, RFID readers, and mobile computers such as personal digital assistants (PDAs), are widely used in retail, manufacturing, and other environments requiring article identification. Optical EIR terminals typically utilize a lens to focus the image of the decodable indicia, such as a bar code, onto a multiple pixel image sensor, which is often provided by a complementary metal-oxide semiconductor (CMOS) image sensor that converts light signals into electric signals. EIR terminals equipped with RFID readers are employed to read and/or modify memory of RFID tags.

SUMMARY OF THE INVENTION

In one embodiment, there is provided an encoded information reading (EIR) terminal comprising a microprocessor communicatively coupled to a system bus, a memory, a communication interface, and a plurality of EIR devices. Each EIR device can be configured to output a decoded message responsive to reading decodable indicia. The EIR terminal can be configured to transmit via the communication interface to an external computer at least one decoded message corresponding to the decodable indicia read by an EIR device. The EIR terminal can be further configured to supplement the decoded message by a source identifier string identifying the EIR device.

In some embodiments, at least one EIR device of the plurality of EIR devices can be provided by an RFID reading device configured to receive an RF signal from at least one RFID tag disposed within the RF range of the EIR terminal. The RFID reading device can be further configured to convert the RF signal into a digital signal representative of the RF signal. The EIR terminal can be configured to produce a decoded message based on the digital signal.

In some embodiments, at least one EIR device of the plurality of EIR devices can be provided by an imaging assembly including a two-dimensional image sensor and an imaging lens. The imaging lens can be configured to focus an image of decodable indicia onto the two-dimensional image sensor. The imaging assembly can be further configured to output a digital signal representative of the light incident on the image sensor. The EIR terminal can be further configured to produce a decoded message by processing the digital signal to decode the decodable indicia. In a further aspect, the imaging assembly can further comprise an amplifier configured to amplify an analog signal outputted by the two-dimensional image sensor, and an analog-to-digital (A/D) converter configured to convert the analog signal into the digital signal. In a further aspect, the two-dimensional image sensor can be provided by a monochrome image sensor or a color image sensor.

In a further aspect, each source identifier string can be provided by a bit string comprising one or more bits or a byte string comprising one or more bytes.

In a further aspect, the EIR terminal can be further configured to receive the source identifier from the external computer.

In a further aspect, the EIR terminal can be further configured to pre-process the at least one decoded message based on at least one parameter received via a user interface or from an external computer.

In a further aspect, the EIR terminal can be further configured to receive at least one message processing command via a user interface or from an external computer.

In a further aspect, the communication interface can be provided by one of: a wired communication interface, a wireless communication interface.

In a further aspect, at least one EIR device of the plurality of EIR device can be communicatively coupled to the system bus via a parallel interface or a serial interface.

In a further aspect, the EIR terminal can further comprise a housing configured to at least partially receive at least one EIR device.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1A:
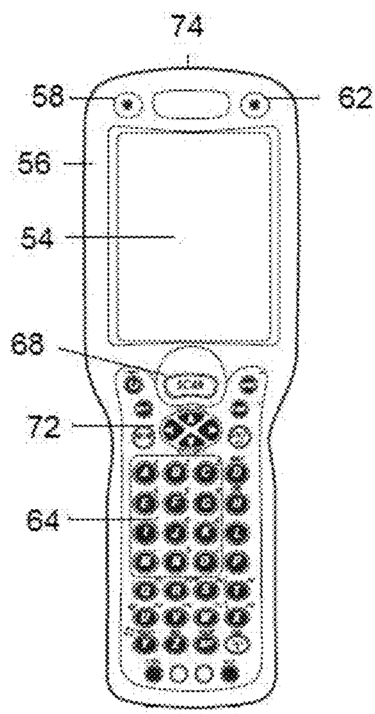
FIGS. 1*a*-1*c* schematically illustrate one embodiment of the EIR terminal described herein.

"Communication network" or "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the network layer of the OSI model can comprise a plurality of lower layer networks, i.e., what can be regarded as a single Internet Protocol (IP) network, can include a plurality of different physical networks.

"Computer" herein shall refer to a programmable device for data processing, including a central processing circuit (CPU), a memory, and at least one communication interface. For example, in one embodiment, a computer can be provided by an Intel-based server running Linux operating system. In another embodiment, a computer can be provided by a virtual server, i.e., an isolated instance of a guest operating system running within a host operating system. In a yet another embodiment, a computer can be provided by an encoded information reading (EIR) terminal. In a yet another embodiment, a computer can be provided by a personal digital assistant (PDA). In a yet another embodiment, a computer can be provided by a smartphone.

"Decodable indicia" herein shall refer to an encoded representation, such as the representation in a bar code symbology, of a sequence of bytes. Decodable indicia can be used to convey information, such as the identification of the source and the model of a product, for example in a EPC bar code that can comprises a plurality of encoded symbol characters representing numerical digits.

Encoded information reading (EIR) terminals can be used, for example, for bar code reading and decoding in point-of-sale (POS) and other applications, including item tracking and inventory control. Item tracking and/or inventory control can be implemented by placing a bar code label and/or an RFID tag on each item to be inventoried. For example, a retail item bearing optical decodable indicia can be scanned by an EIR terminal comprising an imaging device. The optical decodable indicia can be provided, e.g., by a bar code encoding a UPC (universal product code) and/or other byte sequence identifying or characterizing the item bearing the decodable indicia.

In another example, an RFID tag attached to a retail item can be read by an EIR terminal comprising an RFID reading device. The RFID reading device can be configured to read and/or modify a memory of an RFID tag containing an encoded message. Each RFID tag can store the tag identifier in its memory. An RFID tag attached to an inventory item can further store in the tag's memory a product code of the item, an EPC (Electronic Product Code) of the item, and/or a byte sequence identifying or characterizing the item to which the RFID tag is attached.

An EIR terminal comprising multiple EIR devices, including, for example, an optical indicia reading device and an RFID reading device, can be useful for item identification and tracking in manufacturing, retail, storage, and other applications.

The RFID reading device can be further configured to output decoded message data corresponding to the encoded message, e.g., decoded message data containing identifiers of the items to which the RFID tags are attached. The EIR terminal can be configured to store in its memory and/or transmit to an external computer the item identifiers received from the plurality of RFID tags.

The EIR terminal disclosed herein can be configured to output raw data (e.g., the image frame containing an image of decodable indicia) and/or decoded message (e.g., a decoded message corresponding to the optical decodable indicia, or the byte sequence returned by the RFID reading device). In some embodiments, the EIR terminal can transmit the raw data and/or a decoded message to an external computer via a communication interface (e.g., a wireless communication interface). The EIR terminal can be configured to enhance the transmitted data by inserting data items identifying the data source, so that the receiving application or system would be able to distinguish the data read from an optical indicia label from the data read from an RFID tag. In some embodiments, the EIR terminal can pre-process the data before transmitting the data to the external computer.

One embodiment of EIR terminal described herein is shown in FIG. 1*a* (front panel view), 1*b* (side panel view), and 1*c* (bottom panel view). EIR terminal 100 can comprise housing 52 within which other components of EIR terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Imaging window 74 can be disposed on the top panel of housing 52. Disposed on the side panel (best viewed in FIG. 1*b*) can be infra-red communication port 76, access door to a secure digital (SD) memory interface 78, audio jack 80, and hand strap 82. Disposed on the bottom panel (best viewed in FIG. 1*c*) can be multi-pin mechanical connector 84 and hand strap clip 86.

Figure 1B:
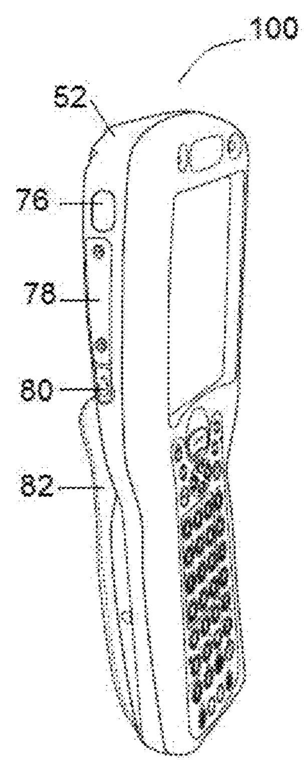
Figure 1C:
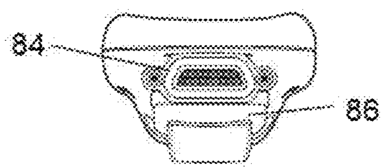

While FIGS. 1*a*-1*c* illustrate a hand held housing, a skilled artisan would appreciate the fact that other types and form factors of terminal housings are within the scope of this disclosure.

Referring now to FIG. 2*a*, described is a component diagram of one illustrative embodiment of the EIR terminal 100. EIR terminal 100 can comprise an imaging assembly 116 including an image sensor 102, such as a CCD image sensor or a CMOS image sensor. Image sensor 102 can in turn comprise a multiple pixel image sensor array 104 having pixels arranged in rows and columns of pixels, column circuitry 106, and row circuitry 108. Associated with the image sensor 102 can be amplifier circuitry 110, and an A/D converter 112 which can convert image information in the form of analog signals read out of multiple pixel image sensor array 104 into the image information in the form of digital signals. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common imaging assembly integrated circuit 116.

EIR terminal 100 can comprise a microprocessor 118 which can be provided by a general purpose microprocessor or by a specialized microprocessor (e.g., an ASIC). In one embodiment, EIR terminal 100 can comprise a single microprocessor which can be referred to as a central processing unit (CPU). Alternatively, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

In a further aspect, EIR terminal 100 can include a direct memory access unit (DMA) 128 for routing image information read out from image sensor 102 that has been subject to conversion to RAM 120. In another embodiment, EIR terminal 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 102 and RAM 120 are within the scope of this disclosure.

In another aspect, EIR terminal 100 can include an imaging lens assembly 130 for focusing an image of the decodable indicia 30 onto image sensor 102. Imaging light rays can be transmitted about an optical axis 132. Lens assembly 130 can be controlled with use of lens assembly control circuit 144. Lens assembly control circuit 144 can send signals to lens assembly 130, e.g., for changing a focal length and/or a best focus distance of lens assembly 130. EIR terminal 100 can further comprise an illumination assembly 136 controlled by the illumination assembly control circuit 146. Illumination assembly control circuit 146 can be communicatively coupled to system bus 158 via interface 164.

In the course of operation of the EIR terminal 100, analog signals can be read out of image sensor 102, converted into a digital form, and stored into a system memory such as RAM 120. A memory 122 of EIR terminal 100 can include RAM 120, a nonvolatile memory such as EPROM 124, and a storage memory device 126 such as may be provided by a flash memory or a hard drive memory. In one embodiment, EIR terminal 100 can include microprocessor 118 which can be configured to read out image data stored in memory 122 and subject such image data to various image processing algorithms. In a further aspect, microprocessor 118 can be configured to process the image data stored in memory 122 and to output the raw image data and/or to locate decodable indicia within the image and to output a decoded message corresponding to the decodable indicia.

In a further aspect, EIR terminal 100 can comprise an RFID reading device 333 communicatively coupled to an RF antenna 338. In some embodiments, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, EIR terminal 100 can transmit information to a passive RFID tag by modulating an RF signal in the 860-960 MHz frequency range. An RFID tag can receive both information and operating energy from the RF signal transmitted by the EIR terminal 100. EIR terminal 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the EIR terminal 100. In one embodiment, the RFID tag can modulate the reflection coefficient of its antenna only responsive to receiving an RFID signal from EIR terminal 100.

In a further aspect, EIR terminal 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

The EIR terminal 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FMO baseband or Miller modulation of a subcarrier at the data rate. The encoding method to be employed by an RFID tag can be selected by the EIR terminal 100.

In another aspect, EIR terminal can establish one or more sessions with one or more RFID tags. An RFID tag can support at least one session-dependent flag for every session. The session-dependent flag can have two states. An RFID tag can invert a session-dependent flag responsive to receiving a command from EIR terminal 100. Tag resources other than session-dependent flags can be shared among sessions. In another aspect, an RFID tag can support a selected status flag indicating that the tag was selected by the EIR terminal 100.

Responsive to receiving an interrogation signal transmitted by the EIR terminal 100, an RFID tag can transmit a response signal back to EIR terminal 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, EIR terminal can implement EPC™ Class-1 Generation-2 UHF RFID Protocol for Communications at 860 MHz-960 MHz by EPCglobal. The EIR terminal 100 can interrogate RFID tags using the commands described herein infra.

Select command can be used by the EIR terminal 100 to select a particular RFID tag population for the subsequent inventory round. Select command can be applied successively to select a particular tag population based on user-specified criteria. Select command can include the following parameters:

1. Target parameter indicates whether Select command modifies a tag's SL flag or Inventoried flag, and in the latter case it further specifies one of four available sessions (S0, . . . , S3);
2. Action parameter indicates whether matching tags assert or deassert SL flag, or set their Inventoried flag to A or B state; tags conforming to the contents of MemBank, Pointer, Length, and Mask parameters are considered to be matching;
3. Mask parameter contains a bit string that a tag should compare to a memory location specified by MemBank, Pointer, and Length parameters;
4. MemBank parameter specifies the memory bank to which Mask parameter refers (EPC, TID, or User);
5. Pointer parameter specifies a memory start location for Mask;
6. Length parameter specifies the number of bits of memory for Mask; if Length is equal to zero, all tags are considered matching.

Inventory command set can be used by the EIR terminal 100 to single out one or more individual tags from a group. A tag can maintain up to four simultaneous sessions and a binary Inventoried flag for each session. Inventory command set includes the following commands:

1. Query command can be used to initiate and specify an inventory round; it contains a slot counter value (Q=0 to 15) determining the number of slots in the round; the command also includes Sel parameter specifying which tags should respond to the Query.
2. QueryAdjust command can be used to adjust the value of the tag's slot counter Q without changing any other parameters;
3. QueryRep command can be used to repeat the last Query command;
4. Ack command can be used to acknowledge a tag's response;
5. NAK command can be used to force a tag to change its state to Arbitrate.

An RFID tag can implement a state machine. Once energized, a tag can change its current state to Ready. A selected tag can, responsive to receiving Query command, select a random integer from the range of [0; $2^{Q-1}$]. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, EIR terminal can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of [0; $2^{Q-1}$], load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, EIR terminal can send a QueryAdjust command causing the tag to invert its Inventoried flag and to transition to Ready state.

Access command set can be used by the EIR terminal 100 for communicating with (reading from and writing to) a tag. An individual tag must be uniquely identified prior to access. Access command set includes the following commands:

ReqRn command can be used by the EIR terminal 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by the EIR terminal 100 to read tag's Reserved, EPC, TID and User memory;

Write command can be used by the EIR terminal 100 to write to tag's Reserved, EPC, TID and User memory;

Kill command can be used by the EIR terminal 100 to permanently disable a tag;

Lock command can be used by the EIR terminal 100 to lock passwords preventing subsequent read or write operations; lock individual memory banks preventing subsequent write operations; permanently lock the lock status of passwords or memory banks;

Access command can be used by the EIR terminal 100 to cause a tag having a non-zero access password to transition from Open to Secured state.

A skilled artisan would appreciate the fact that other methods of interrogating RFID tags by the EIR terminal 100 are within the scope of this disclosure.

Referring again to FIG. 2, EIR terminal 100 can include various interface circuits for coupling several of the peripheral devices to system address/data bus (system bus) 158. EIR terminal 100 can include interface circuit 160 for coupling image sensor timing and control circuit timing and control circuit 144 to system bus 158, interface circuit 162 for coupling the lens assembly control circuit 144 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the RFID reading device 333 to system bus 158.

In a further aspect, EIR terminal 100 can include one or more communication interfaces (including a wired communication interface 172 and/or a wireless communication interface 174) for providing communication with external devices (e.g., a POS cash register computer, a retail store server, an inventory facility server, a local area network base station, or a cellular base station). Wired communication interface can be provided by any combination of known wired communication interfaces, including, but not limited to, Ethernet (IEEE 802.3), USB, RS/232, and RS/485. Wireless communication interface can be provided by any combination of known wireless communication interfaces configured to support, including but not limited to, the following communication protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family.

Figure 3:
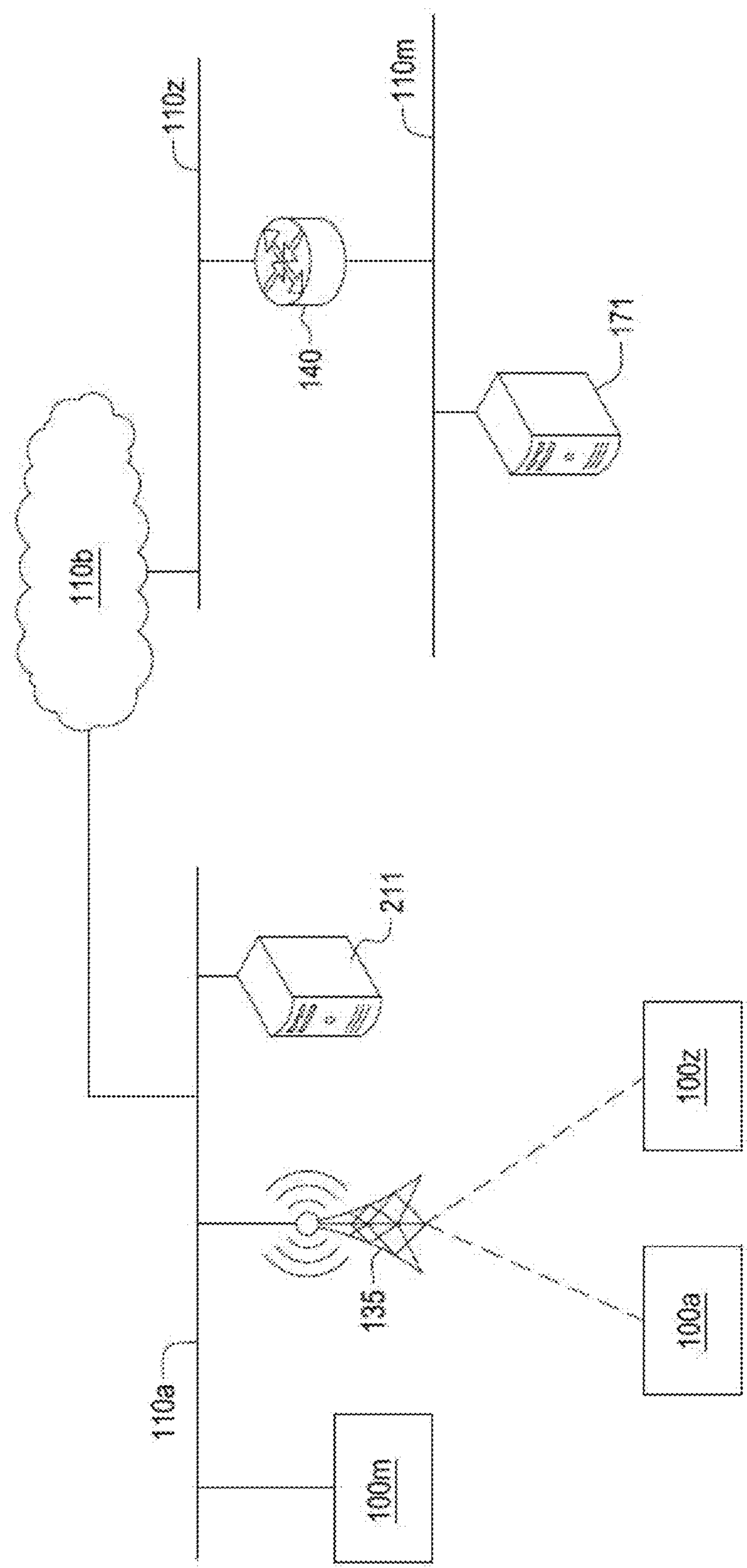
FIG. 3 schematically illustrates a network diagram of one embodiment of a data collection system employing EIR terminals described herein.

In a further aspect, the EIR terminal can be incorporated in a data collection system. One embodiment of the data collection system, schematically shown in FIG. 3, can include a plurality of EIR terminals 100*a*-100*z* in communication with a plurality of interconnected networks 110*a*-110*z*. An EIR terminal 100 can establish a communication session with an external computer 171. In one embodiment, network frames can be exchanged by the EIR terminal 100 and the external computer 171 via one or more routers 140, access points 135, and other infrastructure elements. In another embodiment, the external computer 171 can be reachable by the EIR terminal 100 via a local area network (LAN). In a yet another embodiment, the external computer 171 can be reachable by the EIR terminal 100 via a wide area network (WAN). In a yet another embodiment, the external computer 171 can be reachable by the EIR terminal 100 directly (e.g., via a wired or wireless interface). A skilled artisan would appreciate the fact that other methods of providing interconnectivity between the EIR terminal 100 and the external computer 171 relying upon LANs, WANs, virtual private networks (VPNs), and/or other types of network are within the scope of this disclosure.

The communications between the EIR terminal 100 and the external computer 171 can comprise a series of requests and responses transmitted over one or more TCP connections. A skilled artisan would appreciate the fact that using various transport and application level protocols is within the scope and the spirit of the invention.

In one illustrative embodiment, at least one of the messages transmitted by EIR terminal 100 to external computer 171 can comprise decoded message data corresponding to optical decodable indicia located within one or more images received from imaging assembly 116 of FIG. 1. In one illustrative embodiment, at least one of the messages transmitted by EIR terminal 100 to external computer 171 can comprise a byte sequence returned by RFID reading device 333. As noted herein supra, EIR terminal 100 can be configured to enhance the data transmitted to external computer 171 by inserting data items identifying the data source, so that the receiving application or system would be able to distinguish the data read from an optical indicia label from the data read from an RFID tag.

Figure 2:
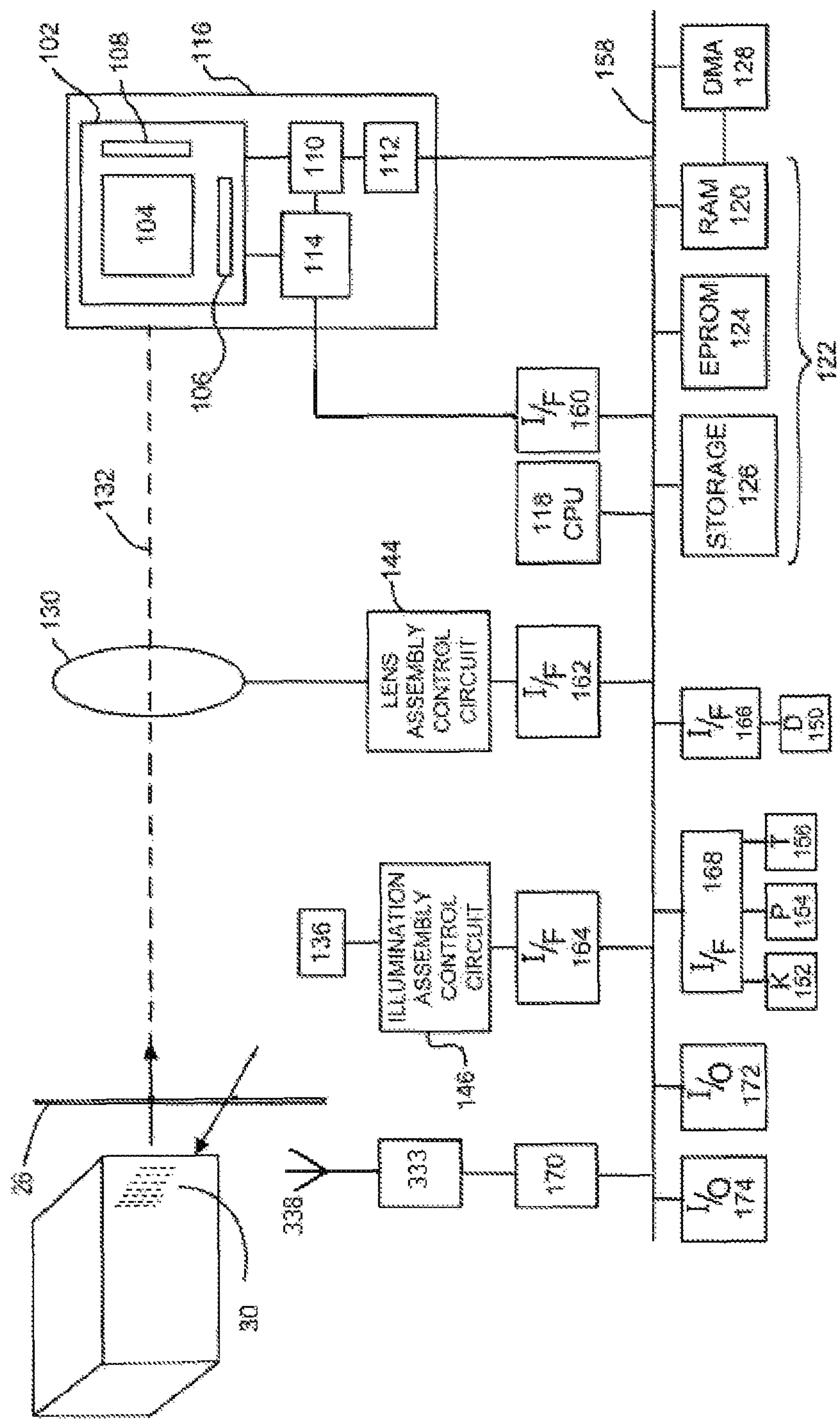
FIG. 2 schematically illustrates a component diagram of one embodiment of the EIR terminal described herein.
Figure 4:
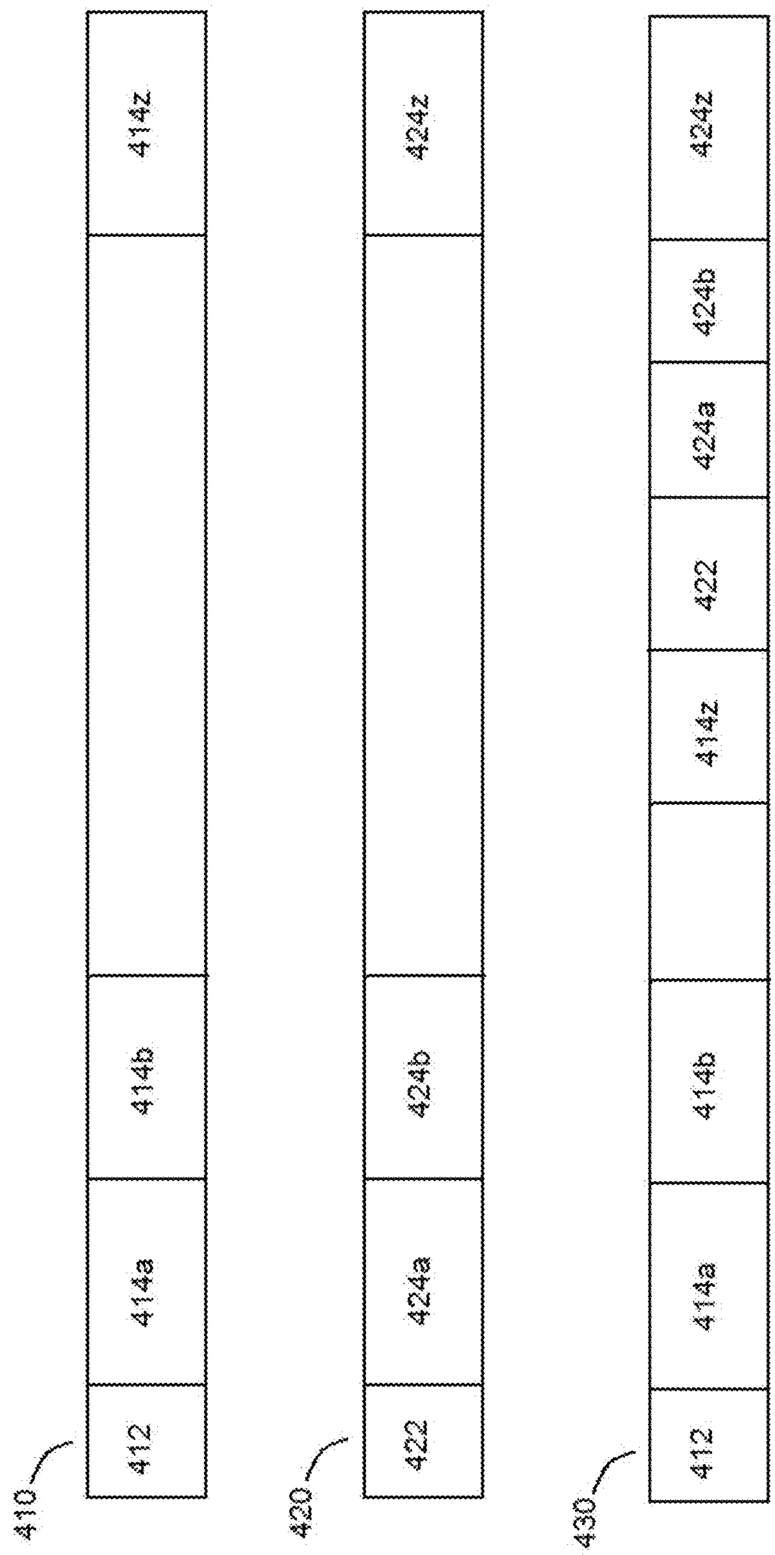
FIG. 4 schematically illustrates message data structures employed by the EIR terminal described herein.

In one illustrative embodiment, schematically shown in FIG. 4, the source identifier 412 can identify the imaging assembly 116 of FIG. 2, and the source identifier 422 can identify the RFID reading device 333 of FIG. 2. EIR terminal 100 can be configured to transmit to an external computer a message sequence 410 comprising a source identifier 412 and one or more decoded messages 414*a*-414*z* produced by EIR terminal 100 by decoding optical decodable indicia. EIR terminal 100 can be further configured to transmit to an external computer a message sequence 420 comprising a source identifier 422 and one or more decoded messages 424*a*-424*z* produced by EIR terminal 100 by reading one or more RFID tags.

In another illustrative embodiment, EIR terminal 100 can be configured to transmit to an external computer a message sequence 430 comprising one or more messages 414*a*-414*z* produced by EIR terminal 100 by decoding optical decodable indicia and identified by the source identifier 412, and/or one or more messages 424*a*-424*z* produced by EIR terminal 100 by reading one or more RFID tags and identified by the source identifier 422.

In a further aspect, each of the source identifiers 412 and 422 can be provided by a bit string or a byte string optionally comprising one or more alphanumeric and/or non-alphanumeric characters. In another aspect, a source identifier 412 can be appended after the last byte of a message 414 or inserted before the first byte of a message 414, and a source identifier 422 can be appended after the last byte of a message 424 or inserted before the first byte of a message 424. In another embodiment, a source identifier 412 can precede two or more messages 422, and a source identifier 414 can precede two or more messages 424.

In some embodiments, EIR terminal 100 can pre-process the decoded message data before transmitting the data to an external computer. In a further aspect, EIR terminal 100 can be configured to receive at least one pre-processing parameter and/or at least one pre-processing command via a user interface.

In one embodiment, responsive to receiving a message containing a pre-processing command, EIR terminal 100 can switch on or off the source identifier insertion mode described herein supra. In another embodiment, EIR terminal 100 can be configured to receive one or more source identifier strings to be used by EIR terminal to identify the source of encoded messages as described herein supra.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of systems and methods that are described herein follows:

A1. An encoded information reading (EIR) terminal comprising:

a microprocessor communicatively coupled to a system bus;

a memory communicatively coupled to said system bus;

a communication interface;

a plurality of EIR devices, each EIR device of said plurality of EIR devices configured to output a decoded message responsive to reading decodable indicia;

wherein said EIR terminal is configured to transmit via said communication interface to an external computer at least one decoded message corresponding to decodable indicia read by an EIR device of said plurality of EIR devices; and wherein said EIR terminal is further configured to supplement said at least one decoded message by a source identifier string identifying said EIR device.

A2. The EIR terminal of (A1), wherein at least one EIR device of said plurality of EIR devices is provided by an RFID reading device configured to receive an RF signal from at least one RFID tag disposed within an RF range of said EIR terminal;

wherein said RFID reading device is further configured to convert said RF signal into a digital signal representative of said RF signal; and wherein said EIR terminal is configured to produce a decoded message based on said digital signal.

A3. The EIR terminal of (A1), wherein at least one EIR device of said plurality of EIR devices is provided by an imaging assembly including a two-dimensional image sensor and an imaging lens, said imaging lens configured to focus an image of decodable indicia onto said two-dimensional image sensor;

wherein said imaging assembly is further configured to output a digital signal representative of light incident on said image sensor; and wherein said EIR terminal is further configured to produce a decoded message by processing said digital signal to decode said decodable indicia.

A4. The EIR terminal of claim 3, wherein imaging assembly further comprises:

an amplifier configured to amplify an analog signal outputted by said two-dimensional image sensor; and an analog-to-digital (A/D) converter configured to convert said analog signal into said digital signal.

A5. The EIR terminal of claim 3, wherein said two-dimensional image sensor is provided by one of: a monochrome image sensor, a color image sensor.

A6. The EIR terminal of (A1), wherein said source identifier string is provided by one of: a bit string comprising one or more bits, a byte string comprising one or more bytes.

A7. The EIR terminal of (A1), wherein said EIR terminal is further configured to receive said source identifier from said external computer.

A8. The EIR terminal of (A1), wherein said EIR terminal is further configured to pre-process said at least one decoded message based on at least one parameter received via a user interface.

A9. The EIR terminal of (A1), wherein said EIR terminal is further configured to pre-process said at least one decoded message based on at least one parameter received from said external computer.

A10. The EIR terminal of (A1), further configured to receive at least one message processing command from said external computer.

A11. The EIR terminal of (A1), further configured to receive at least one message processing command via a user interface.

A12. The EIR terminal of (A1), wherein said communication interface is provided by one of: a wired communication interface, a wireless communication interface.

A13. The EIR terminal of (A1), wherein at least one EIR device of said plurality of EIR device is communicatively coupled to said system bus via one of: a parallel interface, a serial interface.

A14. The EIR terminal of (A1), further comprising a housing configured to at least partially receive at least one EIR device of said plurality of EIR devices.

The invention claimed is:

1. A system comprising:

a plurality of RFID readers that each comprise a unique source identifier, wherein each RFID reader of the plurality of RFID readers is configured to:

read a plurality of RFID tags to determine decoded messages obtained from each of the plurality of RFID tags;

create a message sequence that includes all of the decoded messages;

append the message sequence with the source identifier so that the decoded messages in the message sequence are associated with the RFID reader that read the RFID tag; and output the message sequence to an external computer.

2. The system of claim 1, wherein the RFID reader of the plurality of RFID readers is configured to receive an RF signal from the RFID tag disposed within an RF range of the system;

wherein the RFID reader is further configured to convert the RF signal into a digital signal representative of the RF signal; and wherein the system is configured to produce a decoded message based on the digital signal.

3. The system of claim 1, wherein each RFID reader of the plurality of RFID readers comprises a different source identifier from each other.

4. The system of claim 1, wherein the outputted message identifies both the obtained decoded message and the RFID reader which read the RFID tag so that the external computer identifies which RFID reader out of the plurality of RFID readers read the RFID tag based on the outputted message received from the RFID reader.

5. The system of claim 1, wherein the source identifier string is provided by one of: a bit string comprising one or more bits, a byte string comprising one or more bytes.

6. The system of claim 1, wherein the outputted message comprises a bit string or byte string comprising one or more alphanumeric and/or non-alphanumeric characters.

7. The system of claim 1, wherein the RFID reader receives the source identifier from the external computer.

8. The system of claim 1, wherein the RFID reader is further configured to pre-process the at least one decoded message based on at least one parameter received via a user interface.

9. The system of claim 1, wherein the RFID reader is further configured to pre-process the at least one decoded message based on at least one parameter received from the external computer.

10. The system of claim 1, wherein the RFID reader is further configured to receive at least one message processing command from the external computer.

11. The system of claim 1, wherein the RFID reader is further configured to receive at least one message processing command via a user interface.

12. The system of claim 1, further comprising a communication interface, wherein the communication interface is provided by one of: a wired communication interface or a wireless communication interface, and wherein the RFID reader is further configured to transmit the outputted message to the external computer via the communication interface.

13. The system of claim 1, wherein at least one RFID reader of the plurality of RFID reader is communicatively coupled to a system bus via one of: a parallel interface and a serial interface.

14. The system of claim 1, further comprising a housing configured to at least partially receive at least one RFID reader of the plurality of RFID readers.

15. The system of claim 1, wherein the string identifier is appended to the decoded message after a last byte of the decoded message or inserted before a first byte of the decoded message.

16. The system of claim 1, wherein each RFID reader comprises an ability to activate a source identifier insertion mode of the RFID reader so that the appending is performed in response to activation of the source identifier insertion mode.

17. A system comprising:

a scanner that comprises a first source identifier and is configured to scan decodable indicia to obtain a decoded message from the decodable indicia;

an RFID reader that comprise a second source identifier that is different from the first source identifier to distinguish the RFID reader from scanner, wherein the RFID reader reads an RFID tag to determine a decoded message from the RFID tag;

wherein the system is configured to:

create a message sequence that includes the decoded message of the RFID tag and the decoded message of the decoded indicia;

append the message sequence with the first source identifier associated with the decoded indicia and the second source identifier associated with the RFID tag so that the decoded message of the RFID tag in the message sequence is associated with the RFID reader that read the RFID tag and so that the decoded message of the decoded indicia is associated with the scanner; and output the message sequence.

* * * * *